United States Patent
Jones et al.

(10) Patent No.: US 10,152,190 B2
(45) Date of Patent: Dec. 11, 2018

(54) SYSTEMS AND METHODS FOR IMPROVED APPLICATION SHARING IN A MULTIMEDIA COLLABORATION SESSION

(75) Inventors: Dan Jones, Niwot, CO (US); Todd Vernon, Lafayette, CO (US); Scott Chalfant, Boulder, CO (US)

(73) Assignee: Open Invention Network, LLC, Durham, NC (US)

( * ) Notice: Subject to any disclaimer, the term of this patent is extended or adjusted under 35 U.S.C. 154(b) by 693 days.

(21) Appl. No.: 10/738,357

(22) Filed: Dec. 15, 2003

(65) Prior Publication Data

US 2005/0132299 A1 Jun. 16, 2005

(51) Int. Cl.
*G06F 3/0481* (2013.01)
*G06Q 10/10* (2012.01)
*H04N 7/15* (2006.01)
*G06F 3/14* (2006.01)
*G09G 5/14* (2006.01)

(52) U.S. Cl.
CPC .......... *G06F 3/0481* (2013.01); *G06Q 10/10* (2013.01); *H04N 7/15* (2013.01); *G06F 3/1454* (2013.01); *G06F 2203/04803* (2013.01); *G09G 5/14* (2013.01)

(58) Field of Classification Search
CPC ......... G06F 3/0481; G06F 2203/04803; G06F 3/0484
USPC .......... 348/14.03, 14.07; 715/748, 759, 779, 715/751
See application file for complete search history.

(56) References Cited

U.S. PATENT DOCUMENTS

| | | |
|---|---|---|
| 5,440,699 A | 8/1995 | Farrand et al. |
| 5,530,795 A | 6/1996 | Wan |
| 5,583,993 A | 12/1996 | Foster et al. |
| 5,608,426 A | 3/1997 | Hester |
| 5,608,872 A | 3/1997 | Schwartz et al. |
| 5,623,603 A | 4/1997 | Jiang et al. |
| 5,634,018 A | 5/1997 | Tanikoshi et al. |
| 5,649,104 A | 7/1997 | Carleton et al. |
| 5,659,693 A * | 8/1997 | Hansen et al. ............ 715/779 |
| 5,706,502 A | 1/1998 | Foley et al. |
| 5,742,670 A | 4/1998 | Bennett |
| 5,745,711 A | 4/1998 | Kitahara et al. |

(Continued)

FOREIGN PATENT DOCUMENTS

| | | |
|---|---|---|
| DE | 197 17 167 A1 | 10/1998 |
| DE | 19717167 A1 | 10/1998 |

(Continued)

OTHER PUBLICATIONS

Screen Dumps of Windows Media Player 9 used on Windows XP, 2002, Figs. 1-12.*

(Continued)

*Primary Examiner* — Christopher J Fibbi (57) ABSTRACT

A share display in a multimedia collaboration system includes a desktop region and a non-overlapping task bar region. A collaboration program is configured to allow the desktop region to be shared with remote multimedia collaboration devices for the purposes of collaboration, but allows control functionality so that whatever the sharer does not wish to share will reside in the task bar region. The task bar region is then prevented from being shared with the remote multimedia collaboration device.

20 Claims, 4 Drawing Sheets

(56) References Cited

U.S. PATENT DOCUMENTS

| | | | |
|---|---|---|---|
| 5,748,898 A | 5/1998 | Ueda | |
| 5,754,830 A | 5/1998 | Butts et al. | |
| 5,761,419 A | 6/1998 | Schwartz et al. | |
| 5,764,901 A | 6/1998 | Skarbo et al. | |
| 5,778,368 A | 7/1998 | Hogan et al. | |
| 5,781,909 A | 7/1998 | Logan et al. | |
| 5,786,814 A | 7/1998 | Moran et al. | |
| 5,790,818 A * | 8/1998 | Martin | 715/753 |
| 5,809,247 A | 9/1998 | Richardson et al. | |
| 5,819,243 A | 10/1998 | Rich et al. | |
| 5,838,318 A | 11/1998 | Porter et al. | |
| 5,844,979 A | 12/1998 | Raniere et al. | |
| 5,859,974 A | 1/1999 | McArdle et al. | |
| 5,894,556 A | 4/1999 | Grimm et al. | |
| 5,907,324 A | 5/1999 | Larson et al. | |
| 5,916,302 A | 6/1999 | Dunn et al. | |
| 5,920,316 A * | 7/1999 | Oran | G06F 3/0481 715/779 |
| 5,930,238 A | 7/1999 | Nguyen | |
| 5,930,473 A | 7/1999 | Teng et al. | |
| 5,933,417 A | 8/1999 | Rottoo | |
| 5,940,082 A | 8/1999 | Brinegar et al. | |
| 5,944,791 A | 8/1999 | Scherpbier | |
| 5,951,652 A | 9/1999 | Ingrassia, Jr. et al. | |
| 5,953,506 A | 9/1999 | Kalra et al. | |
| 5,978,835 A | 11/1999 | Ludwig et al. | |
| 5,991,276 A | 11/1999 | Yamamoto | |
| 5,991,796 A | 11/1999 | Anupam et al. | |
| 5,995,606 A | 11/1999 | Civanlar et al. | |
| 5,995,951 A | 11/1999 | Ferguson | |
| 6,018,774 A | 1/2000 | Mayle et al. | |
| 6,025,871 A * | 2/2000 | Kantor | G06F 3/1423 348/14.03 |
| 6,049,602 A | 4/2000 | Foladare et al. | |
| 6,061,440 A | 5/2000 | Delaney et al. | |
| 6,061,717 A | 5/2000 | Carleton et al. | |
| 6,072,463 A | 6/2000 | Glaser | |
| 6,151,621 A | 11/2000 | Colyer et al. | |
| 6,157,401 A | 12/2000 | Wiryaman | |
| 6,192,394 B1 | 2/2001 | Gutfreund et al. | |
| 6,216,141 B1 * | 4/2001 | Straub et al. | 715/234 |
| 6,237,025 B1 | 5/2001 | Ludwig et al. | |
| 6,240,444 B1 | 5/2001 | Fin et al. | |
| 6,263,365 B1 | 7/2001 | Scherpbier | |
| 6,295,551 B1 | 9/2001 | Roberts et al. | |
| 6,310,941 B1 | 10/2001 | Crutcher et al. | |
| 6,335,927 B1 | 1/2002 | Elliott et al. | |
| 6,343,313 B1 | 1/2002 | Salesky et al. | |
| 6,411,988 B1 | 6/2002 | Tafoya et al. | |
| 6,542,936 B1 | 4/2003 | Mayle et al. | |
| 6,570,590 B1 * | 5/2003 | Dubrow et al. | 715/751 |
| 6,598,074 B1 | 7/2003 | Moller et al. | |
| 6,728,784 B1 | 4/2004 | Mattaway | |
| 6,785,244 B2 | 8/2004 | Roy | |
| 6,907,447 B1 * | 6/2005 | Cooperman et al. | 709/203 |
| 7,185,054 B1 * | 2/2007 | Ludwig et al. | 709/204 |
| 7,266,779 B2 * | 9/2007 | Baek et al. | 715/778 |
| 7,451,181 B2 * | 11/2008 | Sasaki et al. | 709/204 |
| 2002/0026478 A1 * | 2/2002 | Rodgers et al. | 709/205 |
| 2003/0085922 A1 | 5/2003 | Wei | |
| 2003/0105820 A1 * | 6/2003 | Haims et al. | 709/205 |
| 2003/0225836 A1 * | 12/2003 | Lee et al. | 709/205 |
| 2003/0229900 A1 * | 12/2003 | Reisman | 725/87 |
| 2004/0103151 A1 * | 5/2004 | Ettinger et al. | 709/205 |
| 2004/0172588 A1 * | 9/2004 | Mattaway | H04L 12/1822 715/201 |
| 2004/0179036 A1 * | 9/2004 | Teplov et al. | 345/751 |
| 2004/0268263 A1 * | 12/2004 | Van Dok et al. | 715/733 |

FOREIGN PATENT DOCUMENTS

| | | |
|---|---|---|
| EP | 0622931 A3 | 5/1996 |
| EP | 0779732 A2 | 6/1997 |
| EP | 0874323 A1 | 10/1998 |
| EP | 0908824 A2 | 4/1999 |
| JP | H07-49837 | 2/1995 |
| JP | H08284141 A | 10/1996 |
| JP | 2002289377 A | 10/2002 |
| WO | WO1995/35535 | 12/1995 |
| WO | 9926153 A2 | 5/1999 |
| WO | 0056050 A1 | 9/2000 |
| WO | 0169418 A1 | 9/2001 |

OTHER PUBLICATIONS

Universal Internet Conference Information System, H. Abdel-Wahab, I. Stoica, F. Sultan Informatics and Computer Science 1996.

Jacobs, S., et al., "Filling HTML Forms Simultaneously: CoWeb-Architecture and Functionality," Computer Networks and ISDN Systems 28(11): 1385-1395 (1996).

Moralee D., "Scientific Graphics and Visualization Come to the Internet", Scientific Computing World, Mar. 1, 1995, p. 31, 33/34, 36 XP000571217 *p. 34, '2: The Internet carries videoconferencing MICE across Europe*.

Hao MC et al, "Collaborative Computing: A Multi-Client Multi-Server Environment", Conference on Organizational Computing Systems, Milpitas, CA, Aug. 123-16, 1995 Comstock N; Ellis C (EDS) pp. 206-213, XP000620968.

Proceedings of the Conference on Emerging Technologies and Applications vol. 1 1996 pp. 60-63. Vetter, RJ; Junalacada, C. "A Multimedia System for Asynchronous Collaboration".

"Interactive Remote Recording and Playback of Multicast Video Conferences" W. Holfelder (1998).

* cited by examiner

SYSTEMS AND METHODS FOR IMPROVED APPLICATION SHARING IN A MULTIMEDIA COLLABORATION SESSION

FIELD OF THE INVENTION

This invention relates generally to the use of digital computer devices and networks to facilitate human communications and interaction and, more particularly, to a user interface mechanism on a computer display used to facilitate such communication in a multimedia collaboration session.

BACKGROUND OF THE INVENTION

In the course of conducting activities involving multiple parties, a need often arises for people to share information, exchange data or documents, discuss topics of mutual interest, or collaborate in preparing various documents or other work product. It may not be desirable, or possible, for all of the participants to meet in the same physical location at the same time, in which case meeting objectives may be achieved using various communication equipment and networks as tools for facilitating remote collaboration in a multimedia collaboration session. It can be useful for such a session to include a variety of media types that include the participants' voices, video images, shared documents, text messages, drawings, computer screen images, etc.

In such a session it is often desirable for all participants to be shown a view of the computer display of one of the participants. An example of this is when one participant is viewing a document on a computer display and it is desired that all participants be able to view the document simultaneously on their own displays, e.g., for discussion. This process and the mechanism to accomplish it is referred to by various terms, including application sharing, screen sharing, desktop sharing, and application viewing. Such a mechanism can allow one participant to select some region of a computer screen and share it so that other participants can see the region and all of the changes that happen in that region. In addition, some application sharing systems allow remote participants to control a pointer device (mouse) and keyboard input of the shared region. There can be several ways for the sharer to select a region to share in a conventional application sharing environment, including selecting the entire display, selecting all windows associated with a specific application, or selecting a specific region of the screen defined by a geometric shape.

Participants in a multimedia collaboration session often use computers and operating systems that display information to a user using a windowing metaphor familiar to modern computer users. Areas of the display known as windows are associated with different sources of information, such as application programs, file system contents, or system properties. Windows are positioned on a background area comprising much of the screen, often referred to as the desktop.

Many window systems also present a "toolbar" area to the user that is separate from the desktop area. This area may be used for various control and display functions outside the desktop area. Some conventional window systems allow various choices for the location of this area, as well as the ability for the user to interactively change the size and location of the area on the display. This region thus provides an area of the user display that is outside of the desktop and any application windows that are running on the desktop.

Multimedia collaboration sessions often require that a collaboration application be executed on each participating computer, and these applications typically require that an associated window be displayed for control and monitoring the status of the ongoing collaboration session. A difficulty can arise when a participant wishes to use application sharing in a multimedia collaboration session, in that it is undesirable to also share the window associated with the collaboration application with other participants, yet it is also undesirable to remove the session control window from the display area.

Conventional systems use one or more application windows to present all of the various collaborative functionality available to the collaborating participants. The ability for one participant to present documents that all users will see, the ability to annotate on such documents, viewing video of other participants, drawing on a whiteboard, presenting a web tour, are all examples of collaborative functions that are typically presented in these application windows.

Some conventional systems provide a capability to "minimize" the collaboration application window so that it does not appear on the desktop region as a window. In its place, some small user interface element is often displayed to provide a minimum set of functions specific to application sharing. In some systems, this small element is displayed in the application window title bar, a toolbar, in a frame drawn around the region being shared, or by presentation of a small control window on the desktop. However, this approach has several disadvantages.

One disadvantage is that only a very limited amount of functionality can be presented to the user, because the size of the user interface element is restricted to a small area. Another disadvantage is that the user interface element is part of one or more window regions, so it can be hidden or obscured by other windows, which makes access to the application sharing functions difficult. Another disadvantage is that the application flow is confusing, because the main application window that the user is accustomed to dealing with for all other functions disappears and is replaced by a small, hard to find user interface element. Finally, some conventional systems place the minimized element into the title bar of every window on the desktop, which can be confusing.

Conventional collaboration products require users to switch from their meeting interface window to smaller, more limited user interface elements to perform application sharing. Users attempting to access functionality outside of application sharing must stop application sharing and switch back to the meeting interface window to do so. Therefore, in conventional systems a user cannot simultaneously access meeting features while maintaining a full-screen application sharing experience.

BRIEF DESCRIPTION OF THE DRAWINGS

Features, aspects, and embodiments of the inventions are described in conjunction with the attached drawings, in which.

SUMMARY OF THE INVENTION

An improved method of application sharing in a multimedia collaboration session provides enhanced capabilities, improved communications, and reduction in fatigue and eyestrain by moving control and display functions to a taskbar region.

These and other features, aspects, and embodiments of the invention are described below in the section entitled "Detailed Description of the Preferred Embodiments."

DETAILED DESCRIPTION OF THE PREFERRED EMBODIMENTS

While specific embodiments are discussed below, it should be understood that this is done for illustration purposes only and that other components and configurations can be used in accordance with the systems and methods described herein. For example, while the descriptions below are centered around the implementation of application sharing in a multimedia collaboration session system used to facilitate communications between remote participants in a manner similar to a face-to-face meeting, it should be understood that there are many other possible functions, and that the systems and methods described herein should not be limited to any particular function. Rather, the systems and methods described herein can be applied to any type of collaboration or control function that might be present in such an application.

In a display environment configured in accordance with the systems and methods described herein, application control functionality is placed into a taskbar, i.e., a region of the windowing system's display that is not included in the desktop region or toolbar region.

Some windowing systems allow various choices for the location of the taskbar region, as well as the ability for the user to interactively change the size and location of the region. For purposes of this specification and claims that follow, the size, location, arrangement, etc. associated with a particular region can be referred to as the configuration associated with that region. Thus, in some systems, the configuration associated with various windows, or regions can be altered. In such instances, the desktop display can also be resized and possibly repositioned accordingly; however, depending on the embodiment, the desktop display region can really be described as reacting to changes in the size or location of the taskbar so as to ensure that the entire-display is filled in. The taskbar region thus represents an area of the user interface, which is "outside" of the desktop and tool bar display areas and any windows that are displayed in the desktop area.

In one embodiment, when application sharing is started, the collaboration application window can be minimized as in conventional systems, but a windowing system taskbar can be opened and any desired collaborative functions can be associated with an area within this larger area. The systems and methods described herein are not limited to the use of any specific functionality, but instead concern the method of using the windowing system's taskbar area for application functionality. Putting the collaborative application's functionality and control in this region can provide increased functionality and enhanced user experience.

For example, the taskbar region is not restricted to a small area. This allows much more functionality to be presented, including collaborative functionality other than application sharing, e.g., watching video, viewing the list of participants, etc. The larger area can also reduce the eyestrain and fatigue that results from smaller displays.

Further, in some embodiments, the taskbar region can be resized to the user's preference, or even completely closed. This allows the user to manage the desired display area by determining the division of the area between the desktop region and the taskbar. The taskbar region can also be completely outside of the desktop, so it cannot be obscured by any other application windows on the desktop. This obscuring occurs in the desktop region when a window is moved or expanded so that it covers another window display, making it partially or completely invisible to the user.

In one embodiment, the user interface element placed in the taskbar region can be the same element used in the main collaborative application, so that the user is dealing with a consistent interface for all collaborative functions.

Figure 1:
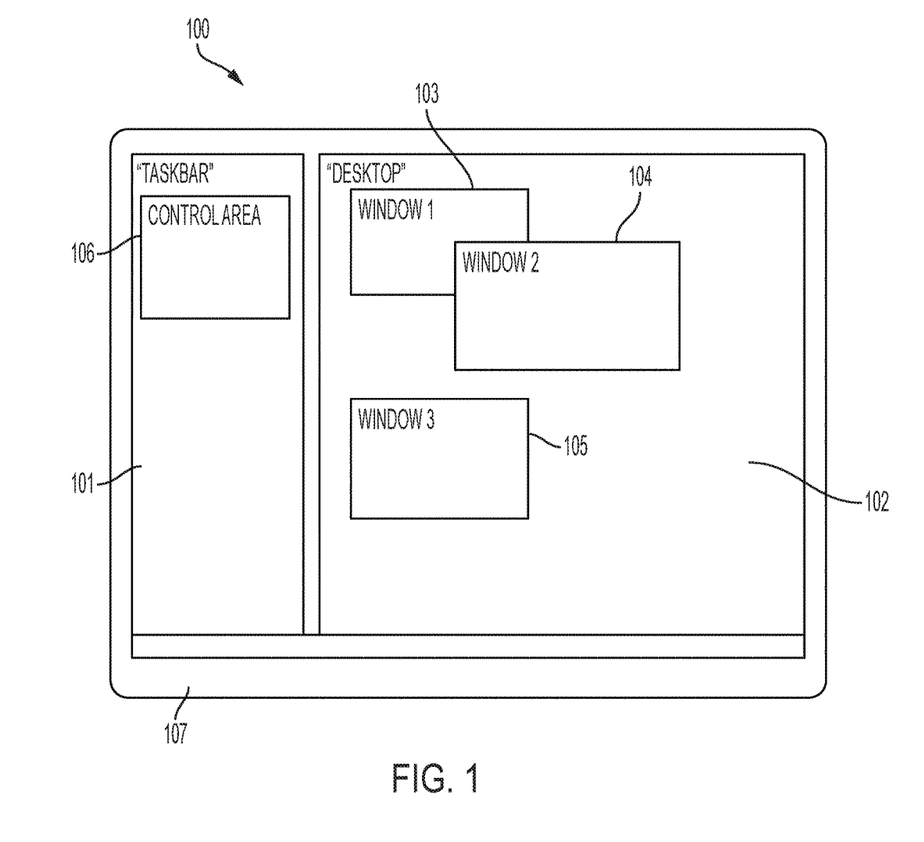
FIG. 1 is a diagram illustrating in schematic form an example of a display in accordance with one embodiment.

FIG. 1 is a diagram illustrating in schematic form an example of a display 100 in accordance with one embodiment of the systems and methods described herein. In the embodiment of FIG. 1, a computer user's display 100 is divided into three regions. The first is a taskbar region 101. The second is a desktop region 102. The third is a toolbar region 107. These three regions together comprise the entire display and do not intersect or overlap. Application windows are presented in the desktop region 102. Three windows 103, 104 and 105 are shown for illustration. An illustration of a control area 106 is shown in the taskbar region 101. The control area 106 may present any number of functional elements, controls, or displays. In addition multiple instances of control area 106 may appear in taskbar region 101.

In the example of FIG. 1, certain elements are fixed in number while others may have multiple instances. For example, there is always exactly one taskbar region 101 and in many embodiments there is one desktop region 102 in the display 100. On the other hand, there can be many instances of windows, e.g. 103, 104, 105, within the desktop region 102 and many instances of control areas similar to control area 106 in the taskbar region 101. In other embodiments, there can be a plurality of taskbar regions 101. Elements that can be present in multiple instances are shown in small number for clarity only and no limit to the number of instances possible should be construed based on the number shown in FIG. 1.

It should also be noted that taskbar 101 is shown on the left side of the display area, but can also be on the top, bottom, right, or any other area of the display as required, or allowed, by a particular implementation. Similarly, the taskbar location may be changeable by the user.

In one embodiment, taskbar region 101 can be resized by the user, and desktop region 102 can be automatically resized in response thereto, such that the entire display area excluding toolbar region 107, if present, is always entirely filled by the combination consisting of desktop region 102 and taskbar region 101. In this way the user is given control over the relative size of application desktop region 102 and taskbar control region 101. In one embodiment, taskbar 101 can be configured to be capable of being completely closed so desktop region 102 covers the entire display 100.

Figure 2:
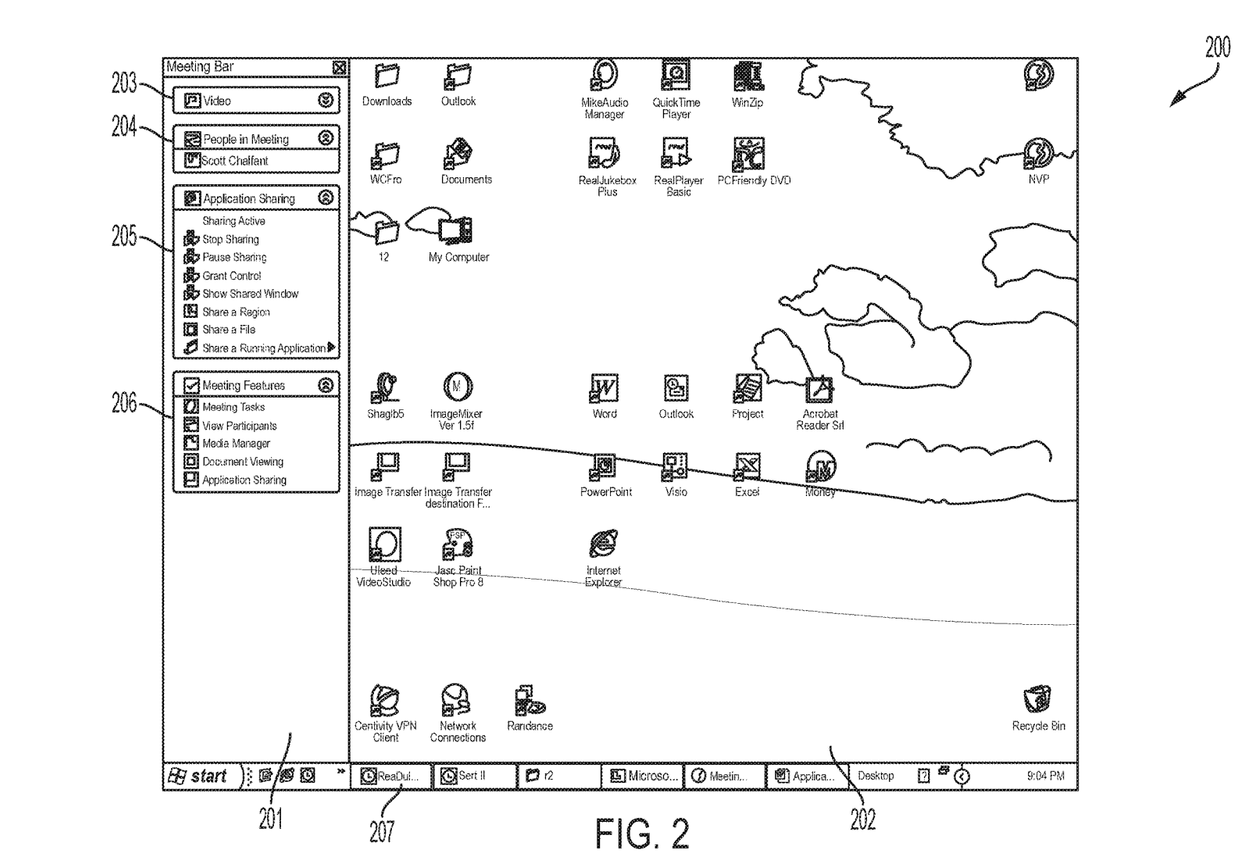
FIG. 2 is a diagram illustrating a screen image of an example implementation in a real windowing system of the display in FIG. 1.

FIG. 2 is a diagram illustrating a screen image 200 of an example implementation in a real windowing system of the display in FIG. 1. With reference to FIG. 2, there is a display 200. The display 200 is divided into a taskbar region 201, a desktop region 202, and a toolbar region 207. The desktop region 202 is shown containing a number of icons and user interface elements, which are not individually significant in this description. The taskbar region 201, here labeled "Meeting Bar," contains four control areas. A control area 203 is labeled "video." A control area 204 is labeled "People in Meeting" and shows a single participant in a list. A control area 205 is labeled "Application Sharing" and presents several options for control of the application sharing function. A control area 206 is labeled "Meeting Features" and presents a menu of several options related to meeting control. The control areas shown illustrate the property of the present invention of placing various controls in the taskbar area.

Figure 3A:
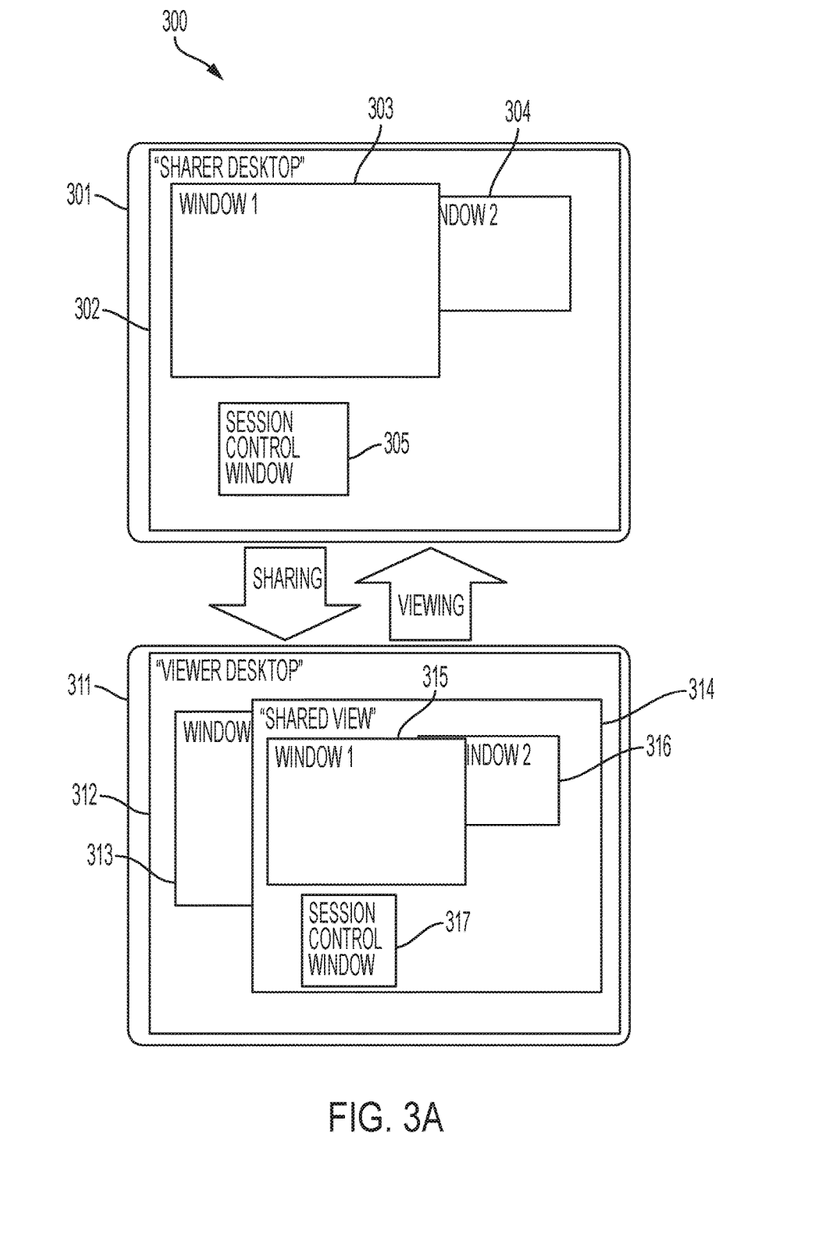
FIG. 3A is a set of diagrams illustrating exemplary displays associated with a conventional application sharing environment.

FIG. 3A is a set of diagrams illustrating exemplary displays associated with a conventional application sharing environment. A sharer display 301 contains a desktop region 302 occupying the entire area of display 301. The desktop region 302 displays three windows, 303, 304 and 305. The object of application sharing session 300 is to share desktop region 302 including the contents of windows 303 and 304. Window 305 is associated with control and status of the application sharing session and it is desired not to share its contents.

Further in FIG. 3A, a participant in the application viewing session is shown having a display 311 with a viewer desktop region 312. It should be noted that a single viewer display 311 is shown for clarity, but conventional application sharing sessions can include many similar viewers, displays, and participants. Viewer desktop 312 displays two windows, 313 and 314. Window 313 is not associated with the application sharing session and is shown to illustrate that viewer desktop 312 can display other windows. Window 314 is the application sharing viewing window and displays an image corresponding to sharer desktop 302. In window 314, subwindow 315 corresponds to window 303, subwindow 316 corresponds to window 304 and subwindow 317 corresponds to window 305. A notable aspect is that subwindow 317 is displayed to the viewer, although the sharer did not wish to provide a view of this window to participants.

Further in FIG. 3A, if the object is to share one of the application windows, e.g., window 303, rather than the entire desktop area 302, a similar difficulty occurs. If the user resizes shared window 303 or moves shared window 303, window 305 for controlling the collaboration application sharing function can become obscured by window 303.

Figure 3B:
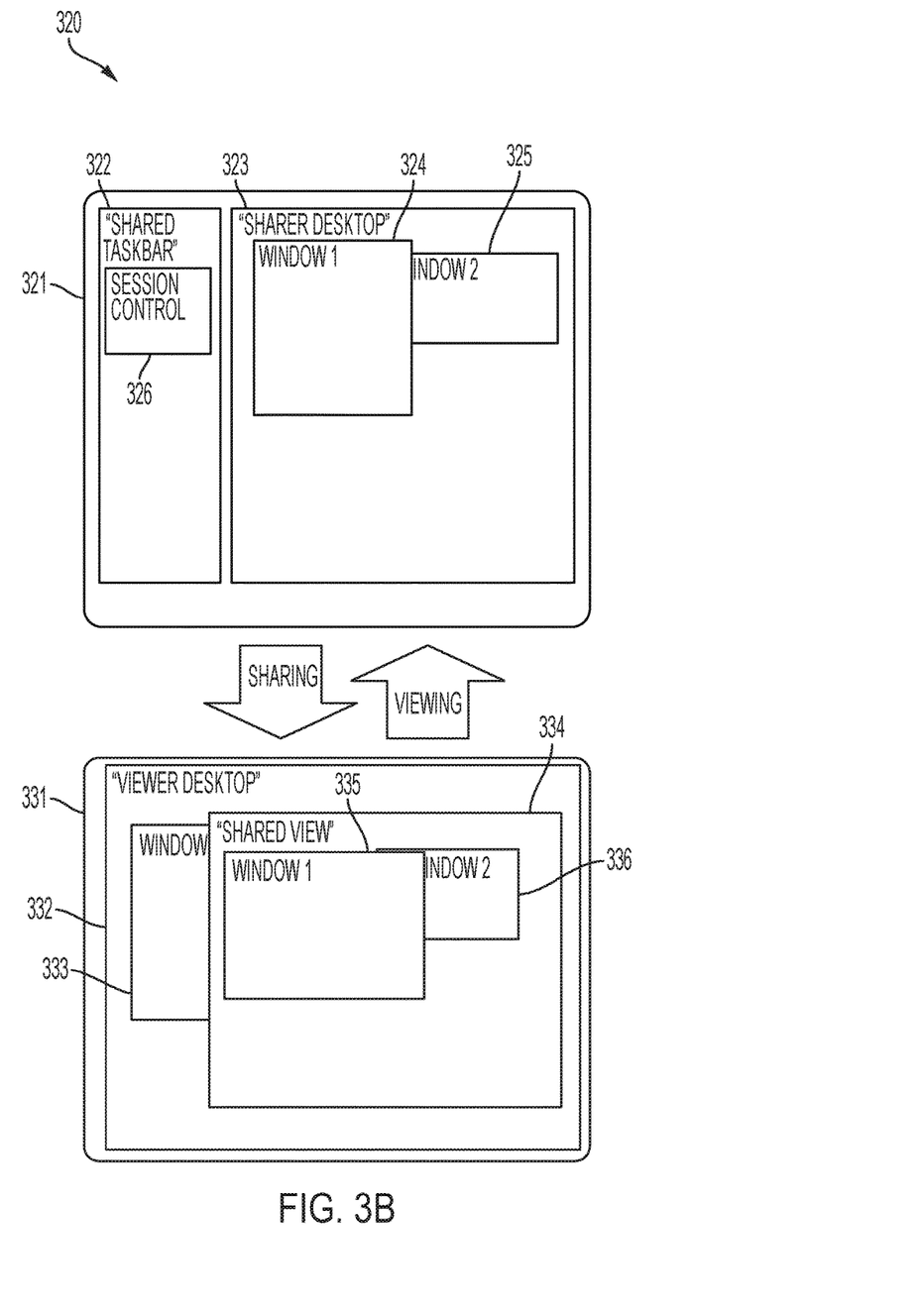
FIG. 3B is a set of diagrams illustrating example displays associated with an application sharing environment configured in accordance with one embodiment.

FIG. 3B, on the other hand, is a set of diagrams illustrating example displays associated with an application sharing environment configured in accordance with the systems and methods described herein. Application sharing session 320 is again established and shows a single viewer for clarity. Sharer display 321 contains two regions: a sharer taskbar region 322 and a sharer desktop region 323. Desktop region 323 displays two windows 324 and 325. It is assumed that sharer wishes to share the desktop region 323 and the contents of the two windows 324 and 325 with the viewer. In accordance with the embodiment of FIG. 3A, session control area 326 is now displayed in the taskbar region 322. Accordingly, the entire desktop region 323 can be shared without sharing session control area 326.

Viewer display 331 is shown containing a desktop region 332. Displayed on the desktop region are a window 333 unrelated to application sharing session and a window 334 displaying a view of the sharer desktop 323. Subwindow 335 corresponds to window 324 and subwindow 336 corresponds to window 325.

In this embodiment, only the desktop region 323 of display 321 is shared and appears in window 334. Control area 326 is placed in taskbar region 322, which is not shared. Thus the sharer is able to use application sharing to share a view of the entire desktop region without restriction on the control area.

In another embodiment according to FIG. 3B, window 324 is shared rather than the entire desktop. Window 324 can be resized or moved to any convenient location on the desktop without obscuring the session control interface 326.

In one embodiment, the sharer is able to change the relative sizes of taskbar region 322 and thus desktop region 323, without affecting the view displayed in shared viewing window 334. That is, although the sharer will view a reduced size desktop region 323, viewer region 334 is displayed as if desktop region 323 occupied the entire display 321. Accordingly, the sharer has the benefit of a large taskbar area for displaying and interacting with complex or multiple controls or other taskbar displays, while still accomplishing the goal of sharing the desktop region and associated windows such that viewers see them full size.

In one embodiment, the sharer and viewer can each use their respective display areas to maximum benefit. The sharer is able to maximize the taskbar region and use most of the display on tasks related to session control, document previews, or other items that he does not wish to share, while the viewer is able to use most of the viewer display to view the shared region contents. Each benefits from having the majority of their display utilized for the task of most interest. This provides larger displays, improved communication, and reduced fatigue and eyestrain.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A local user interface on a display device for application sharing in a multimedia collaboration system, wherein the local user interface, comprises:
   a local user display region associated with a local user interface;
   a taskbar region within the local user display region;
   a desktop region comprising the local user display region and the taskbar region;
   a remote user display region comprising at least one window displayed on the user interface that is shared with at least one remote user interface display;
   one or more control areas, displayed within the taskbar region, used to control the local user display region; and
   wherein, responsive to a share operation, the taskbar region is resized by increasing a size of the taskbar region to efficiently use the taskbar region and the local user display region on tasks related to session control and document previews of unshared contents that are displayed on the local user display region, but that are not shared by the local user interface and that are not visible or accessible to the remote user display region,
   wherein the share operation causes a session control window in the local user display region to be automatically moved to the taskbar region,
   wherein resizing the taskbar region automatically resizes the desktop region to efficiently use a visible area of the desktop region within the local user display region without creating any overlap between any portion of the taskbar region and the desktop region by ensuring the desktop region and the taskbar region together entirely fill the local user display region;

wherein the remote user display region displays contents of a remaining portion of the local user display region, comprising shared contents, without the unshared contents comprising the session control window, that is not shared by the local user interface, and wherein the contents of the remaining portion of the local user display region are displayed on the local user interface at a first size and are displayed on the remote user interface display at a second size larger than the first size, and wherein as the taskbar region is resized on the local user interface and the first size changes, the second size on the remote user interface display does not change.

2. The local user interface of claim 1, wherein the taskbar region can be resized within the local user display region.

3. The local user interface of claim 1, wherein the taskbar region can be closed.

4. The local user interface of claim 1, wherein the taskbar region can be minimized.

5. The local user interface of claim 1, wherein the taskbar region can be relocated within the local user display region.

6. The local user interface of claim 1, wherein the desktop region can be resized within the local user display region.

7. The local user interface of claim 1, wherein each control area in the task region includes a menu of control options.

8. The local user interface of claim 1, wherein a configuration associated with the taskbar region can be changed, and wherein a configuration associated with the desktop region is automatically changed in response to a change in the configuration of the taskbar region.

9. The local user interface of claim 8, wherein the change in the configuration associated with the taskbar region includes a change of the position or a change of the size of the taskbar region.

10. The local user interface of claim 8, wherein the change in the configuration associated with the local user display region includes a change of the position or a change of the size of the local user display region.

11. The local user interface of claim 1, wherein each application window can be resized within the desktop region.

12. The local user interface of claim 1, wherein the taskbar region includes multiple control applications controllable by a local user operating the local user display region via a menu of control options within the control areas.

13. The local user interface of claim 1, further comprising a plurality of taskbar regions.

14. A multimedia collaboration system for application sharing between a local multimedia device and a remote multimedia device, wherein the system comprises:
   a local multimedia device including a sharer interface, wherein the sharer interface comprises:
   a sharer taskbar region;
   a sharer desktop region, wherein the sharer taskbar region represents an area of which is outside the sharer desktop region;
   a sharer display region;
   the sharer desktop region within the sharer display region;
   a sharer control area, displayed within the sharer taskbar region, used to control the display region;
   wherein, responsive to a share operation, the sharer taskbar region is resized by increasing a size of the taskbar region to efficiently use the sharer taskbar region and the sharer display region on tasks related to session control and document previews of unshared contents that are displayed on the sharer display region, but that are not shared by the sharer interface and that are not visible or accessible to a viewer display region, and wherein a configuration associated with the sharer taskbar region is changed which automatically changes a configuration associated with the sharer desktop region in response to the change to the configuration associated with the sharer taskbar region so that the sharer desktop region is resized to efficiently use the sharer desktop region without obscuring any portion of the sharer taskbar region by ensuring the sharer desktop region and the sharer taskbar region together entirely fill the sharer desktop region;
   wherein the share operation causes a session control window in the sharer desktop region to be automatically moved to the sharer taskbar region, and
   a remote multimedia device configured to communicate with the local multimedia device, the remote multimedia device including a viewer interface, wherein the viewer interface comprises:
   the viewer display region;
   a viewer desktop region within the viewer display region;
   wherein the viewer display region displays contents of a remaining portion of the sharer display region, comprising shared contents, without the unshared contents comprising the session control window, that is not shared by the sharer interface, and wherein the contents of the remaining portion of the sharer display region are displayed on the viewer display region at a first size and are displayed on the remote multimedia device at a second size larger than the first size, and wherein as the taskbar region is resized on the sharer interface and the first size changes, the second size on the viewer interface display does not change.

15. The multimedia collaboration system of claim 14, wherein the local multimedia device further comprises a sharer collaborative application that can be activated through a sharer control option provided in the sharer control area of the sharer taskbar region.

16. The multimedia collaboration system of claim 15, wherein the sharer collaborative application is configured to allow at least a portion of the sharer desktop region to be shared with the remote multimedia device, while preventing sharing of the sharer task bar region.

17. The multimedia collaboration system of claim 16, the portion of the sharer desktop region that is being shared with the remote multimedia device.

18. The multimedia collaboration system of claim 14, wherein the local multimedia device is configured so that there is no overlap between any portion of the sharer taskbar region and any portion of the sharer desktop region.

19. A method of application sharing between a local multimedia device and a remote multimedia device in a multimedia collaboration system, the method comprising:
   allocating distinct areas on a sharer display interface of the local multimedia device for a sharer taskbar region and a sharer desktop region wherein the sharer taskbar region represents an area of which is outside the sharer desktop region and a sharer toolbar region, wherein the sharer toolbar region includes the desktop region;
   allocating an area on a viewer display interface of the remote multimedia device for a viewer desktop region;

allocating one or more control areas, displayed within the sharer taskbar region, used to control the area on the viewer display interface;

performing a share operation via the local multimedia device;

responsive to performing the share operation, automatically moving a session control window in the sharer desktop region to the sharer taskbar region and resizing the sharer taskbar region to efficiently use the sharer taskbar region and the sharer display interface on tasks related to session control and document previews of unshared contents that are displayed on the sharer display interface but that are not shared by the sharer display interface and that are not visible or accessible to a viewer display interface, changing a configuration associated with the sharer taskbar region and automatically changing a configuration associated with the sharer desktop region in response to the change to the configuration associated with the sharer taskbar region so that the sharer desktop region is resized to efficiently use the sharer desktop region without obscuring any portion of the sharer taskbar region by ensuring the sharer desktop region and the sharer taskbar region together entirely fill the sharer desktop region; and efficiently using the viewer display interface to display contents of a remaining portion of the sharer display interface, comprising shared contents, without the unshared contents comprising the session control window that is not shared by the sharer display interface, and wherein the contents of the remaining portion of the sharer display interface are displayed on the viewer display interface at a first size and are displayed on the remote multimedia device at a second size larger than the first size, and wherein as the taskbar region is resized on the sharer interface and the first size changes, the second size on the viewer interface display does not change.

20. The method of claim 19, wherein sharing at least a portion of the sharer desktop region comprises sharing with the remote multimedia device a window associated with an application running at the local multimedia device.

\* \* \* \* \*